(12) United States Patent
Marotzke et al.

(10) Patent No.: US 7,490,852 B2
(45) Date of Patent: Feb. 17, 2009

(54) APPARATUS AND METHOD FOR PROVIDING A HORN CONTACT MECHANISM

(75) Inventors: Thomas Marotzke, Bergfelde (DE); Karsten Pietsch, Berlin (DE); Barry C. Worrell, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 531 days.

(21) Appl. No.: 11/159,078

(22) Filed: Jun. 22, 2005

(65) Prior Publication Data

US 2006/0208469 A1 Sep. 21, 2006

Related U.S. Application Data

(63) Continuation-in-part of application No. 11/085,817, filed on Mar. 21, 2005.

(51) Int. Cl.
*B60R 21/16* (2006.01)
(52) U.S. Cl. ....................................... 280/731
(58) Field of Classification Search ................ 280/731; 200/61.54
See application file for complete search history.

(56) References Cited

U.S. PATENT DOCUMENTS

| 5,380,037 | A | 1/1995 | Worrell et al. ............... 280/728 |
| 5,765,860 | A * | 6/1998 | Osborn et al. ............. 280/728.2 |
| 5,767,466 | A * | 6/1998 | Durrani .................... 200/61.54 |
| 6,092,832 | A | 7/2000 | Worrell et al. ............ 280/728.2 |
| 6,196,573 | B1 | 3/2001 | Worrell et al. ............ 280/728.2 |
| 6,237,944 | B1 | 5/2001 | Worrell et al. .............. 280/731 |
| 2005/0161308 | A1 | 7/2005 | Frisch ..................... 200/61.54 |
| 2005/0248135 | A1* | 11/2005 | Poli et al. .................. 280/731 |

FOREIGN PATENT DOCUMENTS

WO WO 00/74980 A1 6/2000 ................ 21/20

* cited by examiner

*Primary Examiner*—Faye M. Fleming
(74) *Attorney, Agent, or Firm*—Douglas D. Fekete

(57) ABSTRACT

Exemplary embodiments of the present invention relate to a steering wheel arrangement for motor vehicles having a steering wheel, an airbag module held at the steering wheel and movable in the direction of the axis of the steering wheel, and an electrical contact system arranged between the steering wheel and the airbag module for the actuation of an electrical functional unit, in particular of a vehicle horn by a relative movement between the steering wheel and the air-bag module taking place in the direction of the steering wheel axis, wherein the contact system includes elongate extended electrical conductors which are attached to mutually confronting sides of the steering wheel and of the airbag module or only to the steering wheel or to the airbag module and extend in such a way that conductors spaced apart in the direction of the steering wheel axis cross at least one contact position.

8 Claims, 15 Drawing Sheets

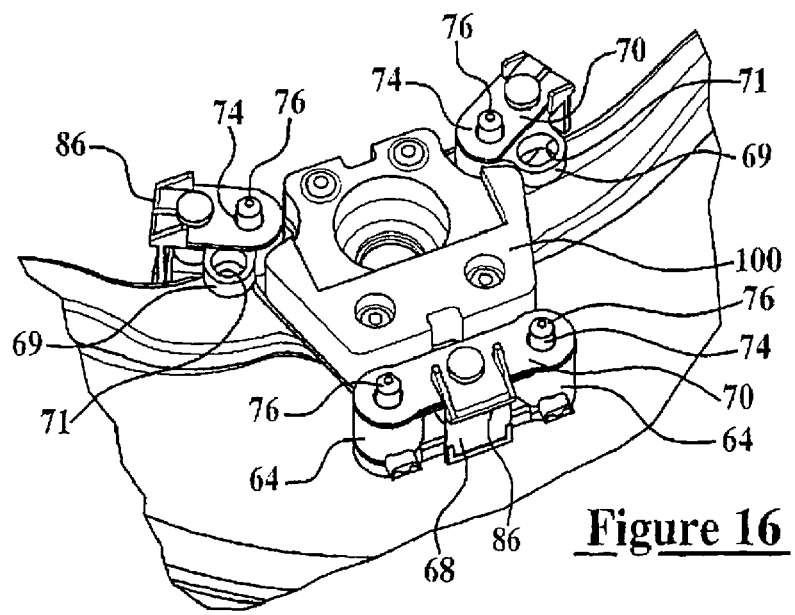
Figure 16
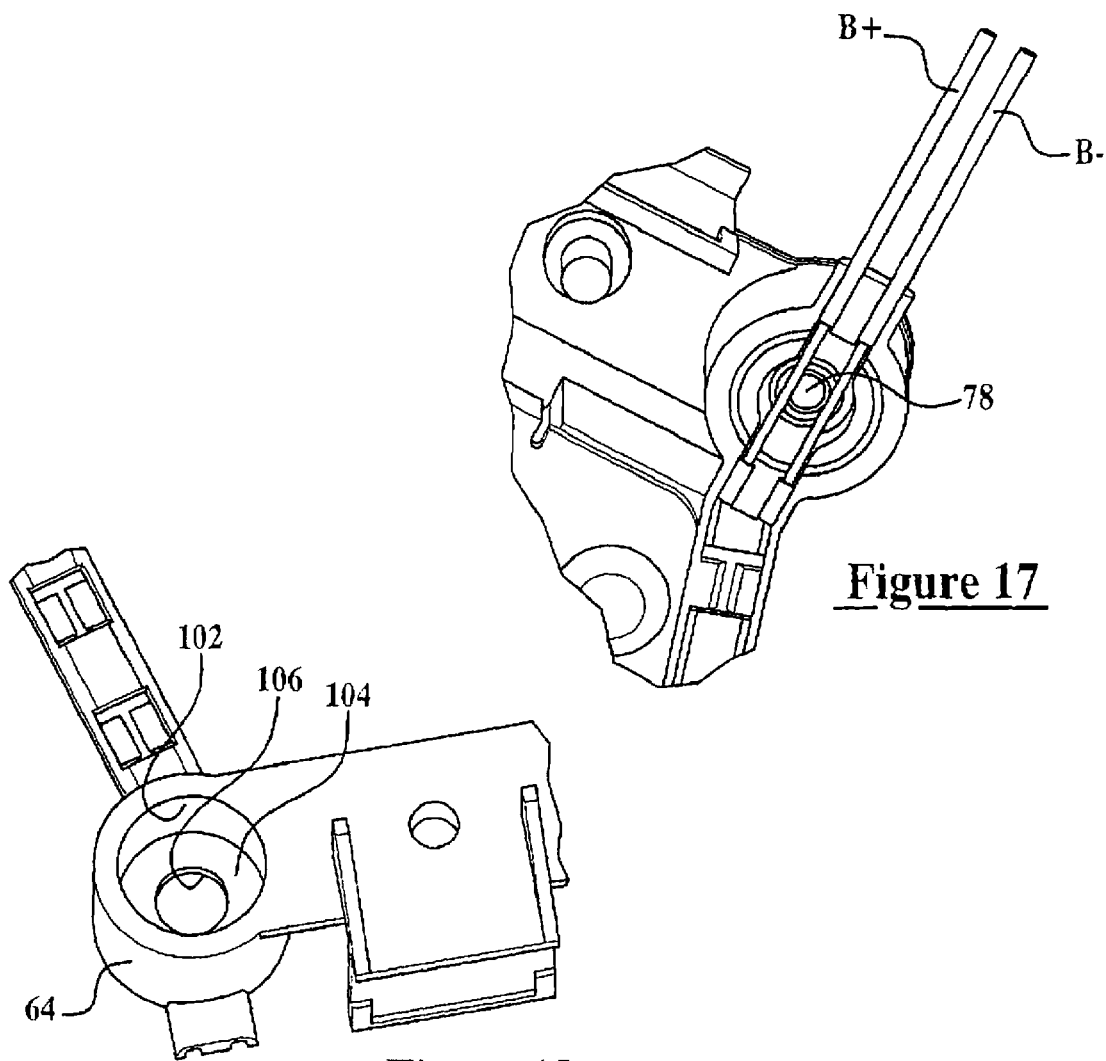
Figure 17
Figure 18

APPARATUS AND METHOD FOR PROVIDING A HORN CONTACT MECHANISM

CROSS REFERENCE TO RELATED APPLICATIONS

This application is a continuation-in-part of U.S. patent Ser. No. 11/085,817, filed Mar. 21, 2005, the contents of which are incorporated herein by reference thereto.

TECHNICAL FIELD

The present invention relates to horn contact mechanisms and more particularly the present invention relates to an apparatus and method for providing a horn contact mechanism, which also provides a means for securing an airbag module to a vehicle component.

BACKGROUND

Vehicles are supplied with driver side airbag modules; generally the driver side airbag module is located in the center of the steering wheel. This is also the same location where a horn-activating switch has traditionally been mounted. In addition, other inflatable cushions or airbag modules have been installed in vehicles.

Various mounting mechanisms have been used for securing airbag modules to support structures in a vehicle. Non-limiting examples of such support structures include steering wheels and vehicle instrument panels. In one known mounting mechanism, mounting bolts are passed through openings in the vehicle support structures wherein a threaded portion of the mounting bolts engages a complimentary nut or threaded portion of the airbag module.

Another mechanism for use with a driver side airbag module includes a means for providing a horn activation circuit wherein horn contact members are forced into contact in order to complete a horn activation circuit.

In addition, increasingly higher demands are being made on electrical contacts, in particular horn contacts in steering wheel units for motor vehicles. This applies in particular for so-called floating horn systems in which the airbag module serves to actuate the vehicle horn and for this purpose is fixed to the steering wheel so that it is movable in the direction of the steering wheel axis—i.e. "floatingly". The higher requirements relate in particular to the working life and the electrical operability of the contacts. Contact mechanisms electrically insulated from the steering wheel are increasingly demanded which, in the case of the horn systems which are of principal interest are also known under the catchword "isolated floating horn". In such contact mechanisms, so-called open contacts can in particular to be used such as for example contact rivets or, with higher switching demands, encapsulated microswitches.

In known steering wheel units an enormous degree of cost and complexity is sometimes used for the electrical insulation of the contacts, which considerably increases the manufacturing costs. Therefore, it is desirable to provide an apparatus and method for providing a horn contact mechanism that uses a minimal amount of components and is easy to install and manufacture.

SUMMARY

Exemplary embodiments are directed to a method and apparatus for providing a horn switch assembly for securing an inflatable cushion to a steering wheel armature. In one embodiment, the horn switch assembly comprises: a backing plate defining a receiving area, the receiving area being configured to receive at least a portion of the inflatable cushion, the receiving area being defined by a peripheral wall of the backing plate; a plurality of mounting members depending outwardly and away from the peripheral wall, the plurality of mounting members providing a mounting surface, wherein the mounting surface of the plurality of mounting members is configured to receive a mounting mechanism therein, wherein each of the plurality of mounting members further comprises a contact point secured thereto; a non-conductive isolation mechanisms being configured to be secured to the steering wheel armature, wherein the isolation mechanism comprises at least one guide pin and at least one locking pin for guiding and movably securing the mounting mechanism thereto and the isolation mechanism comprises a portion of a wire having a non-insulated portion disposed proximate to the contact point of one of the plurality of mounting members; and a biasing member disposed between each of the mounting members and the isolation mechanism, wherein the backing plate is capable of movement between a first position and a second position, wherein the contact point of one of the plurality of mounting members makes contact with the non-insulated portion of the pair of wires in the second position providing a conductive path therebetween.

In another exemplary embodiment, a horn switch assembly for securing an airbag module to a steering wheel armature is provided, the horn switch assembly comprising: a plurality of mounting mechanisms each being secured to the steering wheel armature, each mounting mechanism providing a means for securing the airbag module thereto; and a plurality of horn activation switches secured to the mounting mechanisms, each horn activation switch comprising: a housing; a plunger slidably received within the housing, the plunger having an airbag module contact end, a conductive horn circuit activation end, and an annular member disposed therebetweeen; and a biasing spring disposed about the plunger between the annular member and the conductive horn circuit activation end, wherein the biasing member makes contact with an inner flange of the housing; and a pair of wires each having a non-insulated portion disposed proximate the conductive horn circuit activation end, wherein the biasing member maintains the conductive horn circuit activation end in a facing spaced relationship with respect to the non-insulated portion of the pair of wires, and application of a force to the airbag module contact end causes the conductive horn circuit activation end to make contact with the non-insulated portion of the pair of wires and complete a horn activation circuit.

In another exemplary embodiment, a backing plate for mounting an inflatable cushion to a vehicle is provided. The backing plate comprising: a receiving area configured to receive at least a portion of the inflatable cushion, the receiving area being defined by a peripheral wall of the backing plate; and a plurality of mounting members depending outwardly and away from the peripheral wall, the plurality of mounting members providing a mounting surface.

Other exemplary embodiments are directed to a steering wheel arrangement for motor vehicles having a steering wheel, an airbag module held at the steering wheel and movable in the direction of the axis of the steering wheel, and an electrical contact system arranged between the steering wheel and the airbag module for the actuation of an electrical functional unit, in particular of a vehicle horn, by a relative movement between the steering wheel and the airbag module taking place in the direction of the steering wheel axis.

The object of exemplary embodiment of the invention is to provide a steering wheel arrangement of the initially named kind which requires the smallest possible number of components in order to realize a reliable and permanently operable, and in particular low resistance contact system, and which makes the manufacture as simple as possible and as cost-favourable as possible, this should in particular also be possible for the integration of an "isolated floating horn" mechanism.

Thus, in accordance with exemplary embodiments of the invention the contact system arranged between the steering wheel and the airbag module includes elongate electrical conductors which are attached to mutually oppositely disposed sides of the steering wheel and of the airbag module, or only to the steering wheel or to the airbag module, and which extend in such a way that conductors spaced apart in the direction of the steering wheel axis cross at at least one contact position. In this arrangement the conductors can each be electrically insulatedly mounted.

The concept of the invention, of realizing a "switch" for the actuation of a functional unit, in particular of a vehicle horn simply by using crossing electrical conductors of elongate, extended shape, for example by correspondingly laid contact wires brings a plurality of advantages, without compromises having to be made when satisfying the initially discussed requirements, which is necessary, such as are placed on modern steering wheel units.

Thus the elongate electrical conductors can already be integrated in a simple manner during the manufacture of the airbag module and of the steering wheel, or of the relevant components, whereby a considerable cost reduction can be achieved. Furthermore, the switch concept of the invention is characterized by an actuating feel or so-called "contactile feeling" which is perceived by the user as being particularly pleasant and which is, for example, to be preferred from the point of view of the user to that of known microswitches or so-called snap-disk contacts. The electrical function of the crossing conductors is at least equivalent with respect to contact resistance, working life and reliability to the known contact arrangements. This applies in particular, when, in accordance with a preferred embodiment, the crossing conductors have a round cross-section and in particular a circular cross-section. If required the electrical operability can be further improved by surface coating or special contact elements.

Through the invention a contact mechanism can be realized in advantageous manner which is characterized by a low conducting resistance over the working life with a small current load in the range of a few thousandths of an ampere and which can be insulated relative to the steering wheel ground or to the vehicle ground or relative to other electrical systems. The high demands which are placed on a contact system with such a low current load in the range of a few thousandths of an ampere can be satisfied by the invention, since burning free or so-called "electrical fritting" of the contact surface is not possible.

The invention furthermore makes it possible to achieve a small contact resistance at a plurality of distributed contact points of the electrical functional unit, in particular of a horn switch. The invention is based on the consideration that every contact surface has a foreign layer resistance which can be reduced by a cunning contact arrangement, with it being possible to destroy the foreign layer with power-free switching using comparatively high forces and a suitable geometry. Contacts between the contact pieces which come close to an ideal point contact yield particularly good results. In this connection the invention enables a self-cleaning of the contact positions without disturbing mechanical or electrical wear. Insulating foreign layers can be destroyed with the contact system of the invention with an adequately high contact force with plastic deformation of the contact pieces by mechanical microcracks or microfractures.

The arrangement of the conductors arranged spaced apart in the direction of the steering wheel axis can take place in diverse manner and means. Thus, one conductor can be attached to the airbag module and one conductor to the steering wheel. In accordance with an exemplary embodiment, two crossing conductors can be jointly attached either to the airbag module or to the steering wheel. The attachment of the conductors can also take place at a so-called contact bridge associated with either the steering wheel or the airbag module, such as is frequently used in customary steering wheel arrangements. In all cases the relative movement between the airbag module and the steering wheel on actuation is exploited in order to allow the conductors to enter into electrical contact with one another at the at least one contact position.

These considerations can be particularly favourably realized in practice with mutually crossing round conductors, i.e. with electrical conductors which have a round or circular cross-section.

Advantageous further developments of the invention can be seen from the dependent claims, the description and also the drawing.

An eventual requirement for electrical insulation of the contact system, in particular with respect to the vehicle ground or to the electrical systems can be particularly simply realized, in accordance with a preferred further development of the invention, in that the conductors are each attached to a component of the airbag module and/or of the steering wheel which is manufactured from an electrically insulating material, in particular of plastic.

The contact system is preferably a component of a floating horn mechanism, such as was, for example, initially explained.

The steering wheel or the airbag module can include a contact bridge and at least one conductor can be attached to the contact bridge. The contact bridge is in particular a component of a floating horn system: For the actuation of a vehicle horn the airbag module which is latched to the steering wheel or connected to it in some other way and means is pressed downwardly relative to the steering wheel in the direction of the steering wheel axis and thus—when the contact bridge is attached to the steering wheel—against the contact bridge, whereby a horn contact is actuated, i.e., in accordance with the invention, the crossing conductors are electrically contacted at the contact position.

The contact bridge can alternatively also be attached to the airbag module. In the context of the present explanation of the invention the contact bridge can thus be seen, at least in the finally installed state, as a component of the steering wheel or of the airbag module, i.e. when there is talk of attachment of one or more conductors to the steering wheel or to the airbag module, then this also includes the possibility that the conductor or the conductors is or are attached to a contact bridge associated with the steering wheel and/or with the airbag module. The floating horn mechanism can be provided in accordance with the invention at the steering wheel or at the airbag module.

The airbag module can include a carrier for a gas generator of the airbag module and at least one conductor can be attached to the generator carrier.

A contact bridge and a gas generator carrier are preferably manufactured of plastic and the crossing conductors are attached on the one hand to the contact bridge and on the other hand to the generator carrier and thus electrically insulated relative to the steering wheel and the airbag module.

At least one conductor is preferably disposed within a plane extending perpendicular to the steering wheel axis. At least one conductor can be provided in the form of a contact wire which preferably has a round and in particular circular cross-section.

Furthermore, at least one conductor can have a surface which is achieved by a special surface treatment, in particular by an upgrade. Thus, by way of example, the conductor surface can be provided with a noble metal such as for example gold or silver or with a corresponding alloy.

At least one conductor can be directly attached to the airbag module or to the steering wheel.

Furthermore, provision can be made that at least one conductor is an integral component of the airbag module or of the steering wheel. For this purpose the conductor can be embedded into the material of the airbag module and/or of the steering wheel, and/or in each case of a corresponding component, by injection moulding plastic around it. The manufacture of the steering wheel unit in accordance with the invention can thus, in particular, be simplified and improved cost-wise in that plastic is already injection-moulded around the electrical conductors during or shortly after the manufacture of the airbag module and/or of the steering wheel and/or of the corresponding plastic components (in particular the gas generator and/or the contact bridges).

Alternatively at least one conductor can be attached by a shape-locked and/or force-transmitting connection to the airbag module or to the steering wheel, in particular by a latch-connection or a clip connection. In this connection the relevant conductor can be directly latched or clipped to the airbag module and/or to the steering wheel. It is also possible that the airbag module and/or the steering wheel is provided with a plurality of individual holders to which the conductor is connected in shape-locked and/or force-transmitting manner. Such individual holders can be integral components of the airbag module and of the steering wheel.

In order to improve the electrical operability and in particular the conduction resistance at least one conductor can be provided at a contact position with an additional contact section, in particular with a contact rivet. The contact section can also be connected to the conductor by a soldering, brazing or welding process. The contact section can in particular be a welded contact. The welded contacts or contact rivets are preferably specially surface-refined and indeed in a manner such as has already been discussed above.

Through the matched contact geometries and special surface treatments particularly high working lives and particularly contact characteristics can be achieved in accordance with the invention. Electrical conductors in the form of contact wires which are executed as round wire or profiled wire are particularly advantageous as a result of their ideal shape.

BRIEF DESCRIPTION OF THE DRAWINGS

FIGS. 14A-24 are views of a mounting mechanism and horn activation switch constructed in accordance with alternative exemplary embodiments of the present invention;

DETAILED DESCRIPTION OF EXEMPLARY EMBODIMENTS

Exemplary embodiments of the present invention are directed to an apparatus and method for providing a horn activation mechanism. In addition, exemplary embodiments are directed to horn activation mechanisms configured for use with and/or comprising a portion of the mechanism for attaching the driver side airbag module to the vehicle.

This application is related to U.S. Pat. Nos. 5,380,037; 6,092,832; 6,196,573; 6,237,944; U.S. patent application Ser. No. 10/373,161, filed Feb. 24, 2003; U.S. patent Ser. No. 10/797,440 filed Mar. 10, 2004 and U.S. Provisional Patent Application No. 60/608,595, filed Sep. 4, 2004, the contents each of which are incorporated herein by reference thereto.

In particular, exemplary embodiments of the present invention are directed to an airbag module connection assembly for use with "snap-in" driver side airbag modules and/or floating horns switches and exemplary embodiments are directed to apparatus and methods for limiting the number of components necessary to provide both a horn activation switch and a method or means for securing an airbag module to a steering wheel armature. An exemplary embodiment comprises a backing plate or base plate stamped from a piece of stock material such as steel wherein the backing plate defines a mounting area for a portion of the airbag module and a plurality of mounting members are configured to depend away from the mounting area, wherein the mounting members are configured for securement to the steering wheel.

Figure 1:
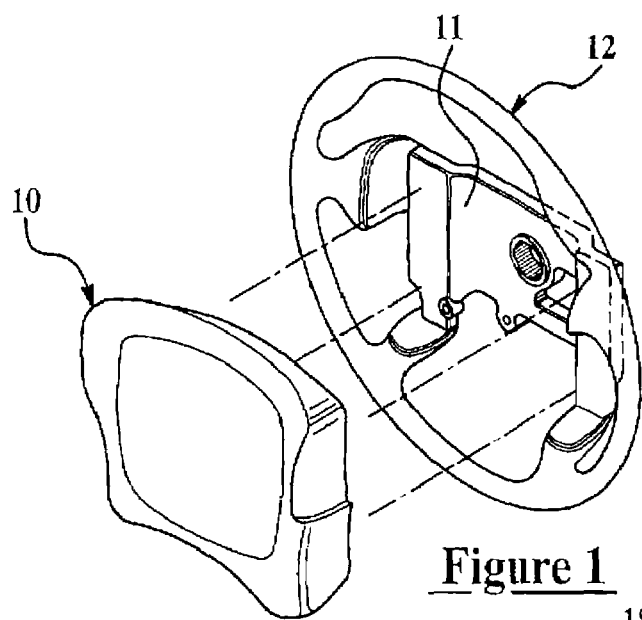
FIG. 1 is a perspective view of an airbag module and a steering wheel configured to receive the airbag module.
Figure 2:
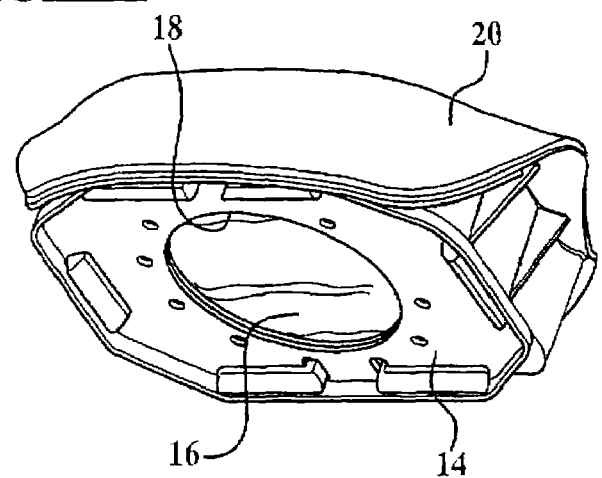
FIG. 2 is a perspective view of an airbag module.

Referring now to FIGS. 1 and 2, a driver side airbag module 10 is illustrated. Driver side airbag module 10 is typically mounted to a hub or armature 11 of a steering wheel 12. Typically, some form of mounting mechanism is provided to mount the airbag module to the steering wheel. As will be disclosed herein exemplary embodiments of the present invention are directed to mounting mechanisms for mounting the airbag module to the steering wheel as well as providing a horn activation circuit wherein the cost and complexity of the same is reduced. Generally, airbag modules include a base plate or backing plate 14 configured for receiving and engaging an inflatable cushion 16 and an inflator each of which is secured to the backing plate, which is then secured to the steering wheel. Although a driver side airbag module is illustrated, alternative exemplary embodiments of the present invention, without horn activation circuits are not intended to be limited to be used solely with driver side airbag modules. Other non-limiting uses include mounting mechanisms for side airbag modules, roof rail airbags and passenger airbags.

Generally, and referring now to driver side airbag modules, the backing plate will include a central opening 18 configured for receiving a portion of the inflator therein. As is known in the related arts, the inflatable cushion is constructed out of a material configured for inflation upon receipt of an inflation gas from the inflator when certain predetermined vehicle conditions are sensed. The inflatable cushion is normally folded and covered by a plastic cover 20, which preferably has an outer soft pad. As is known in the related arts the cover may be secured to the backing plate in any suitable manner, such as by cover tabs snapped over indented portions in the backing plate, as best shown in FIG. 2. In addition, the cover preferably includes tear lines or weakened portions that permit the cover to open during inflation of the inflatable cushion.

Figure 3:
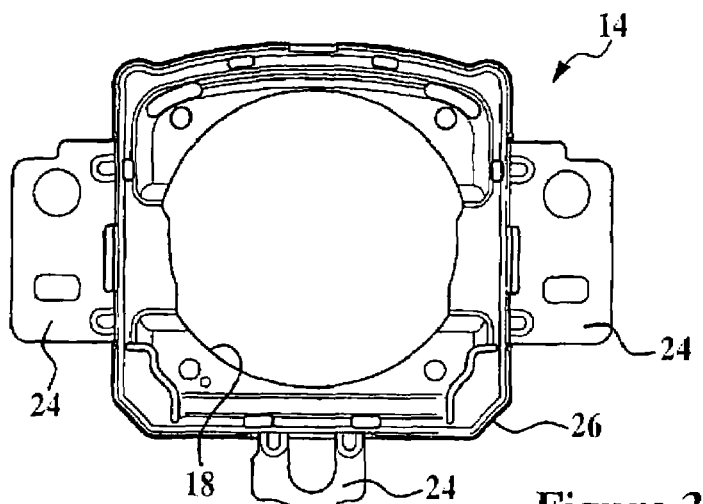
FIG. 3 is a top plan view of a base plate or backing plate constructed in accordance with an exemplary embodiment of the present invention.
Figure 4:
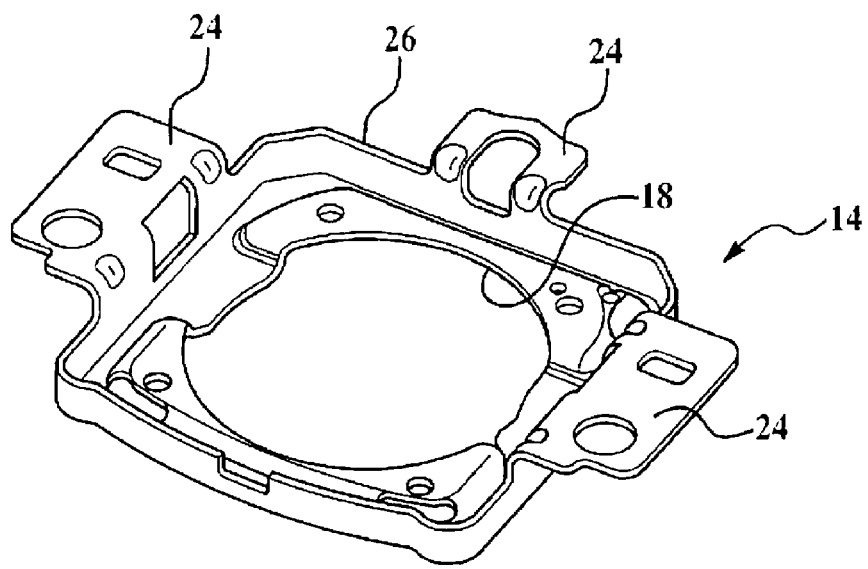
FIG. 4 is a perspective view of a base plate or backing plate constructed in accordance with an exemplary embodiment of the present invention.
Figure 5:
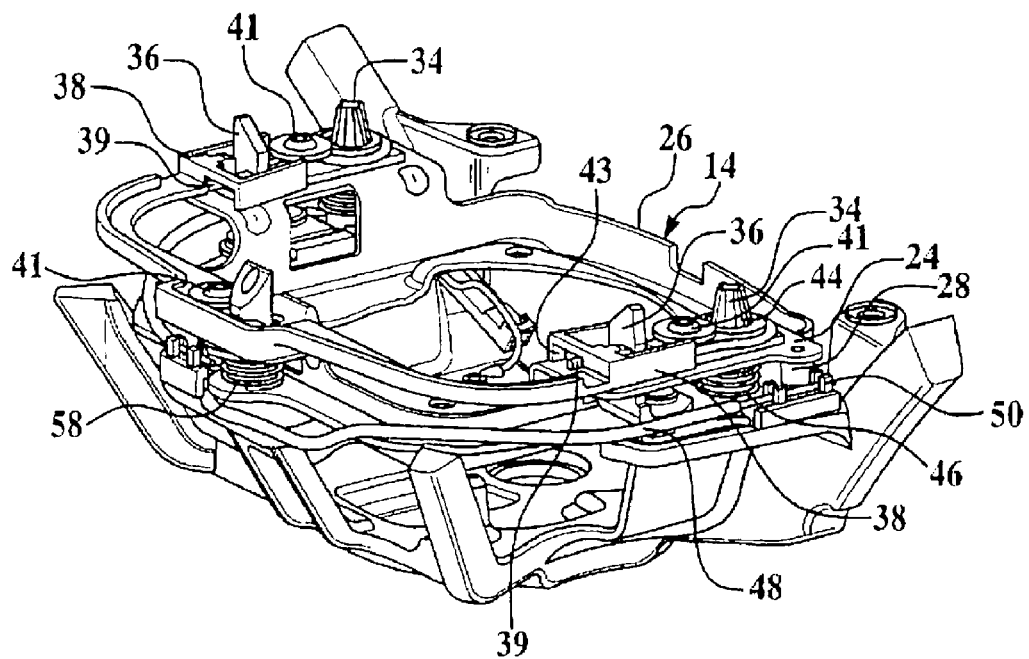
FIG. 5 is a perspective view of a base plate or backing plate constructed in accordance with an exemplary embodiment of the present invention secured to a steering wheel armature.

Referring now to FIGS. 3-8, exemplary embodiments of the present invention are illustrated. FIGS. 3 and 4 illustrate backing plate 14 wherein the backing plate is configured to define a receiving area 22 for receiving a portion of component parts of the airbag module (e.g., inflator, inflatable cushion, retainer ring, etc.) and a plurality of mounting flanges 24, which depend away from a periphery 26 of the receiving area. In accordance with an exemplary embodiment three mounting flanges depend away from periphery 26, two at either side of the receiving area and one located between the other two. This configuration provides stability to the mounting of the airbag module to the armature as it moves between horn activating and non-horn activating positions. Of course, it is understood that any number of mounting flanges are contemplated to be within the scope of the present invention. As will be discussed herein mounting flange or mounting member 24 provides a surface area for mounting the airbag module to the steering wheel. In addition, the mounting flanges are provided with apertures for facilitating the securement of the base plate to the steering wheel armature.

Referring now to FIGS. 5-8 and in accordance with one exemplary embodiment, the securement of backing plate 14 to the steering wheel armature is illustrated. In accordance with an exemplary embodiment the backing plate is movably secured to the steering wheel armature wherein an applied force to the airbag module will cause the backing plate to move from a facing spaced relationship towards the steering wheel armature. In addition, FIGS. 5-8 also illustrate the features of the horn activation mechanism or switch. As illustrated, each mounting flange has a contact point 28 secured thereto. In accordance with an exemplary embodiment contact point 28 comprises an electrically conductive material which will close or complete a circuit of a horn activation mechanism when the backing plate is moved toward the armature from a first position to a second position, wherein the contact point will complete the horn activation circuit and activate the horn. A non-limiting example of an embodiment of contact point 28 is a copper rivet. In addition, and in this embodiment backing plate 14 is also formed out of a conductive material, which is provided with an electrical current thus contact point 28 is provided with a current or a conductive path to complete a circuit or close a horn activation switch when contact point 28 makes contact with another portion of the horn activation circuit. A non-limiting example of the conductive material for backing plate 14 is steel.

As illustrated in FIGS. 5-8, a non-conductive isolation mounting mechanism 30 is secured to the armature. The non-conductive isolation mounting mechanism comprises guide pins 34 and locking pins 36 integrally molded therein. The locking pins are configured to engage a locking pin proximate to an opening in a mounting feature or mounting mechanism 38, which is secured to the mounting flanges by snapping or securing the same into at least one opening in at least one mounting flange. In an exemplary embodiment, mounting mechanism 38 and isolation mounting mechanism 30 comprise a non-conductive material, such as plastic, which is easily molded into the configurations illustrated in the attached figures. Also, and as illustrated mounting mechanism 38 and non-conductive isolation mounting mechanism 30 each comprise a single unitary structure having a "U" shaped configuration. Of course, other configurations are contemplated to be within the scope of the present invention. Thus, mounting features or mounting mechanism 38 and non-conductive isolation mounting mechanisms 30 provide a non-conductive securement between steering wheel armature 11 and base plate 14. In order to secure locking pins 36 to the backing plate locking spring members 39 are secured to the mounting feature via bolts or rivet 41, wherein locking spring member 39 is positioned to engage an opening or slot in the locking pin. The locking springs are positioned and configured to be biased into a locking configuration wherein the airbag module is prevented from being completely removed from the steering wheel armature unless the locking spring is urged into a non-locking position by a tool such as a screwdriver blade wherein the locking spring is no longer engaged in the opening of the locking pin, thereby allowing removal of the airbag module from the steering wheel armature. In addition, rivets, bolts or fastener 41 may be used to secure mounting mechanism 30 to the mounting members 24.

In addition, the insulator is also configured to have an opening or slots 43 in a sidewall to allow for biasing of the locking spring into the non-engagement position. Accordingly, the locking pins are configured to engage a portion of the locking spring, which provides a means for securing the airbag module to the steering wheel armature.

Figure 12:
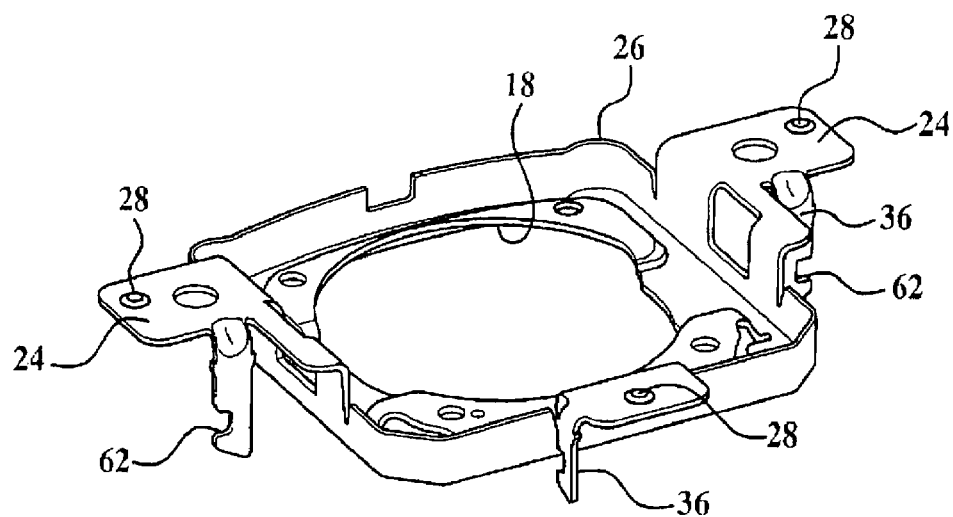
FIG. 12 is a perspective view of a base plate or backing plate constructed in accordance with an alternative exemplary embodiment of the present invention.
Figure 13:
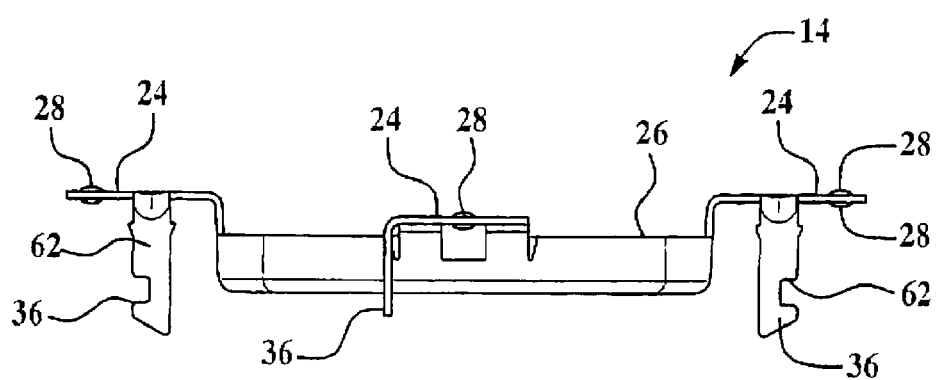
FIG. 13 is a side view of a base plate or backing plate constructed in accordance with an alternative exemplary embodiment of the present invention.

Locking pins 36 comprises an opening (illustrated in FIG. 12 as item 62) for engaging the spring member disposed proximate to an opening in feature 38. The opening of the locking pin is configured to have a height or width large enough to allow movement of the backing plate to and from the armature while preventing disengagement of the locking pin from the opening in the mounting feature.

In addition, guide pins 36 are configured to have a partial frustoconical shape for slidably engaging openings 44 of mounting feature 38. Disposed about the guide pins and between the mounting members are biasing springs 46. The biasing springs are under compression after locking pin 36 engages the locking member disposed proximate to the opening in the mounting feature. Thus, biasing springs 46 provide a biasing force for maintaining the backing plate in a facing spaced relationship with the steering wheel armature.

Figure 6:
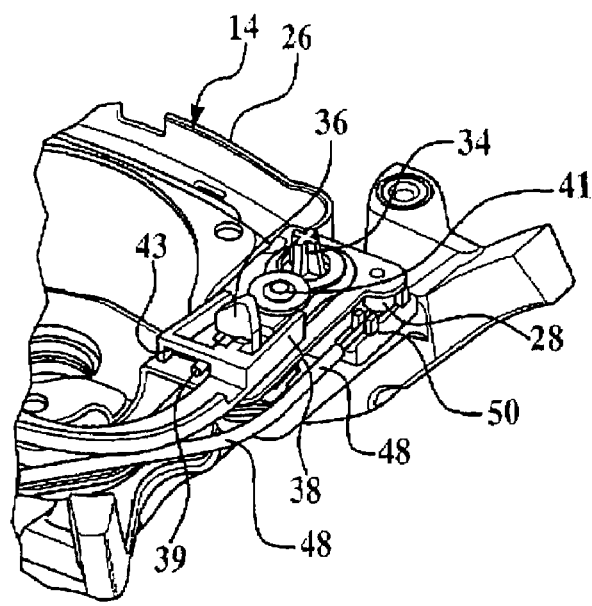
FIGS. 6-8 are partial perspective views of a base plate or backing plate and isolation mechanism constructed in accordance with an exemplary embodiment of the present invention.
Figure 7:
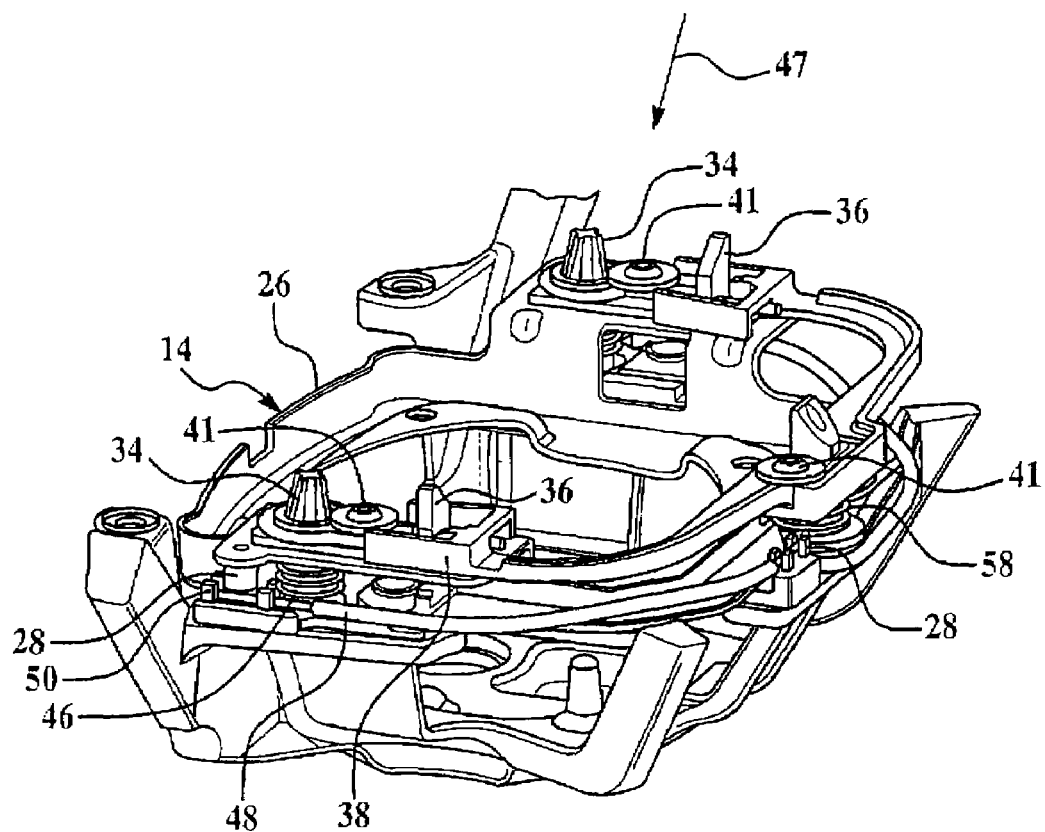

Thus, and as a force is applied to the airbag module generally in the direction of arrow 47, the mounting flanges are able to move towards the non-conductive isolation mechanisms wherein contact point 28 is able to contact a wire 48 disposed in a wire mounting feature 50 of non-conductive isolation mounting mechanism 30. As illustrated in FIG. 6, a single wire may be positioned to have non-insulated portions located proximate to the backing plate. Once the contact point touches the wire a circuit of the horn activation system is completed and the horn is activated. In other words, contact point 28 comprises an electrically conductive material allowing a current to flow from the wire through the electrically conductive member of the backing plate, which is either connected to a ground or a power supply via another wire thus, completing a circuit wherein the completion of the circuit will cause the horn sound. Once the force is removed the biasing force of the biasing spring will return the backing plate and mounting members in a facing spaced relationship wherein the contact point will no longer complete the horn activation circuit. It is also noted in this embodiment that the armature is also configured to allow for the movement of the backing plate to and from the armature.

As illustrated in FIGS. 3-8, portions of the mounting mechanism are formed and located on the backing plate while complementary features are secured to the armature in order to provide a mounting mechanism and a horn switch, wherein the complexity and number of components are reduced thus providing a more efficient means for securing the airbag module to the armature while also providing a horn activation circuit. In addition, the lead to the non-conductive isolation mounting mechanism is isolated from the armature by the non-conductive material of the mounting mechanism thereby preventing the same from inadvertently completing the horn activation circuit. Moreover, the configuration of the mounting member and the horn activation switch allows the number of parts to be reduced thus decreasing the costs and complexity associated with the mounting mechanism and horn activation switch.

Figure 8:
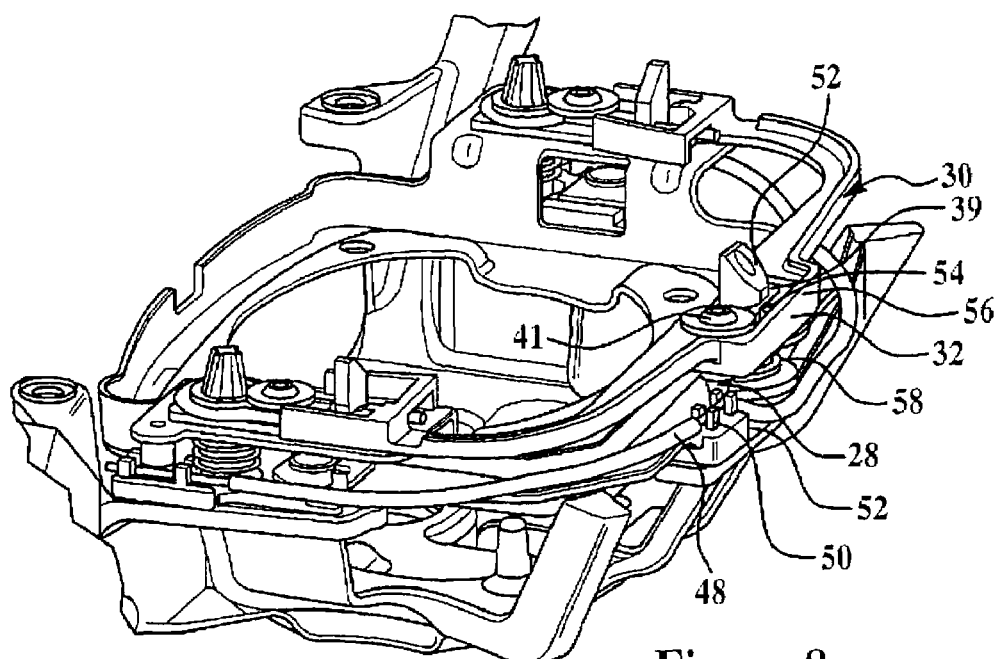
Figure 9:
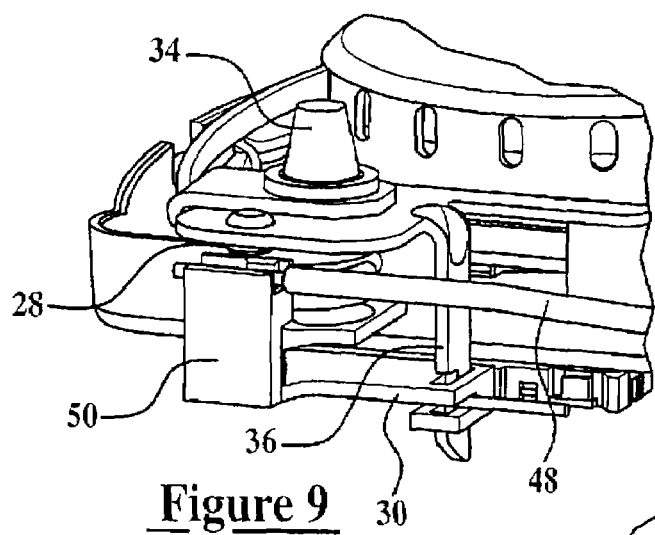
FIGS. 9-11 are partial perspective views of a base plate or backing plate and isolation mechanism constructed in accordance with an alternative exemplary embodiment of the present invention.
Figure 10:
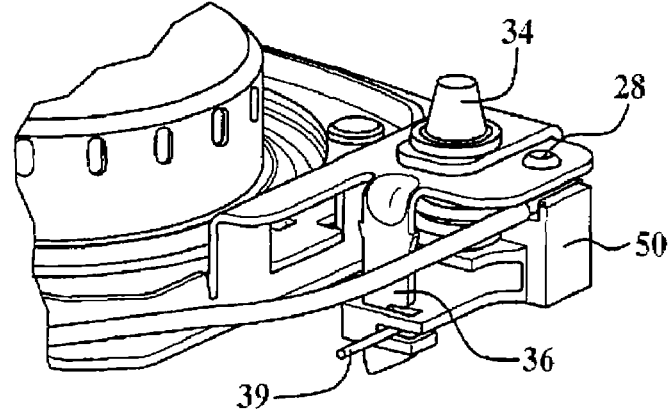
Figure 11:
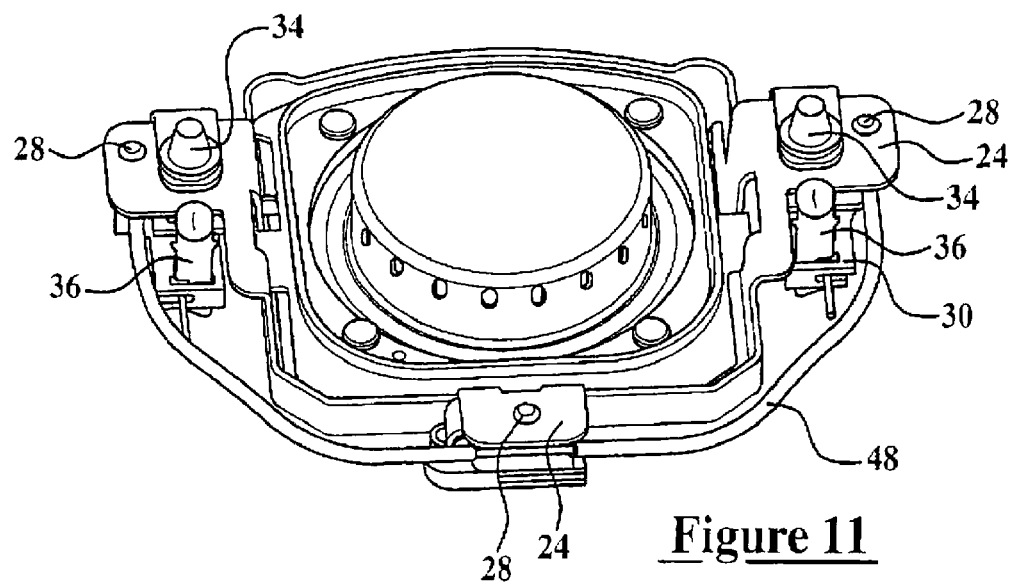

Referring now to FIG. 8, a middle mount portion 32 of the non-conductive isolation mounting mechanism is illustrated. Here a snap in pin 52 is configured to engage a locking pin 39 disposed proximate to an opening 54 in a mounting feature 56 of mounting mechanism 30, which is mounted to mounting member 24. Snap in pin 52 is configured to provide both features of locking pin 36 and guide pin 34, wherein a biasing spring 58 is disposed about snap in pin 52. Again, a wire 48 is disposed in a wire-mounting feature 50, wherein the horn activation circuit is completed as contact portion 28 makes contact with any one of the un-insulated portion of the wire located proximate to the contact point 28. In accordance with an exemplary embodiment, it is noted that the horn activation circuit is configured to activate the horn once one of the contact portions makes contact with an un-insulated portion of the wire. A non-limiting location of the middle mount non-conductive isolation mounting mechanism is at a six o'clock position on the steering wheel.

In an alternative exemplary embodiment a pair of non-conductive isolation mounting mechanisms 30 and a middle mount non-conductive isolation mounting mechanism 32 are each separately secured to the armature. Referring to the pair of non-conductive isolation mounting mechanisms 30, each non-conductive isolation mounting mechanism comprises a guide pin 34 and a locking pin 36 integrally molded therein. Locking pin 36 is configured to engage a locking member proximate to an opening in a separate mounting feature or mounting mechanism 38, which is secured to each mounting flange by snapping into at least one opening in the mounting flange. In an exemplary embodiment, mounting mechanism 38 comprises a non-conductive material, such as plastic. Thus, mounting features or mounting mechanisms 38 and non-conductive isolation mounting mechanisms 30 and 32 provide a non-conductive securement between steering wheel armature 11 and base plate 14. Accordingly, and in this embodiment three separate non-conductive isolation mounting mechanisms and three mounting mechanisms 38 are provided to secure locking pins to the backing plate, wherein the middle mount non-conductive isolation mounting mechanism has a snap in pin configured to provide both features of the locking pin and the guide pin 34. Again, a wire 48 is disposed in wire-mounting features 50, wherein the horn activation circuit is completed as contact portion 28 makes contact with any one of the un-insulated portions of the wire located proximate to the contact point 28. In accordance with an exemplary embodiment, it is noted that the horn activation circuit is configured to activate the horn once one of the contact portions makes contact with an un-insulated portion of the wire.

Referring now to FIGS. 9-13 an alternative exemplary embodiment of the present invention is illustrated. Here backing plate 14 is configured to have the locking pins stamped from the material comprising mounting flanges or mounting portions 24 and separate non-conductive isolation mounting mechanisms 30 and 32 are configured to have an opening 60 with a locking member 39 for engaging an engagement opening 62 of the locking pins. In addition, mounting mechanisms 38 may also be disposed on the mounting flanges to slidably receive the guide pins. In this embodiment, the locking pins are stamped from the stock material used for backing plate 14 at the same time the backing plate 14 is formed by a stamping process. Accordingly, the die or tool used during the manufacturing process of backing plate 14 is configured to both define backing plate 14 as well as the locking pins. In this embodiment operation of the horn activation switch or circuit is similar to the previous embodiments wherein the backing plate is applied with a current via wire and the circuit is complete or the switch is closed when the contact point makes contact with the non-insulated portion of wire 48.

Referring now to FIGS. 14A-22, other alternative exemplary embodiments of the present invention are illustrated. Here, a horn activation switch 64 is mounted proximate to a mounting mechanism 68. Switch 64 is secured to mounting mechanism 68 by a reinforcement plate 70. A non-limiting example of the material contemplated for reinforcement plate 70 is steel. Switch 64 comprises a housing 72 configured to slidably receive a plunger 74 therein. Plunger 74 is configured to have an airbag module contact portion 76, a horn switch contact portion 78 and an annular member 80 disposed therebetweeen. Annular member 80 and plunger 74 are configured to locate a biasing member 82 between annular member 80 and a bottom portion 84 of housing 72. Accordingly, plunger 74 is capable of movement between a non-horn activation position to a horn activation position wherein biasing member 82 is compressed. Therefore, once an actuating force is removed the biasing spring will move the airbag module and contact portion 76 away from a horn activating position.

Figure 14A:
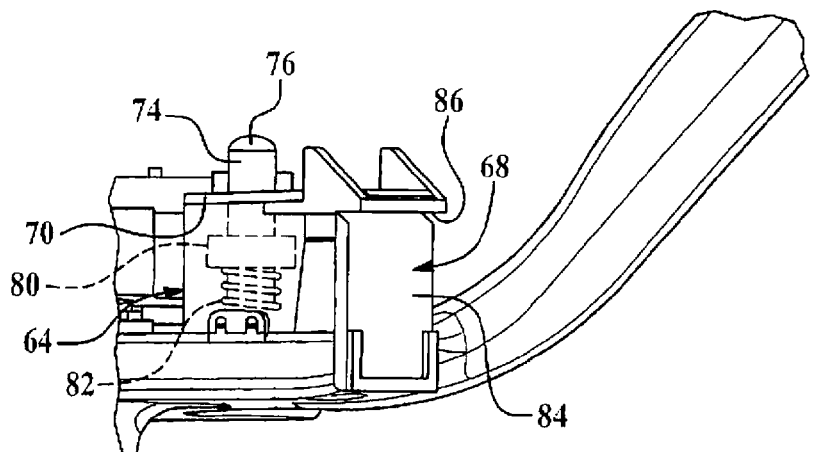
Figure 14B:
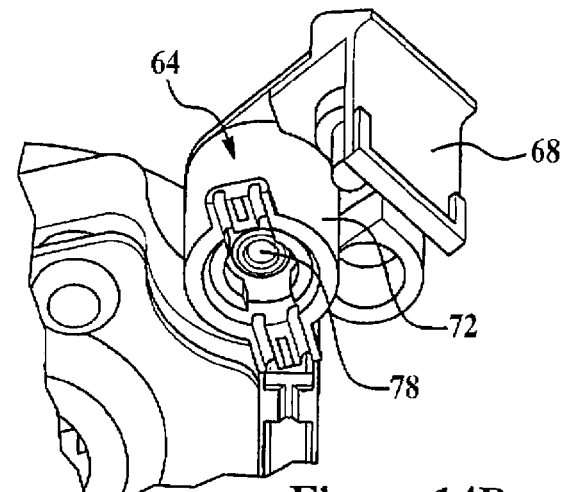

In one embodiment, and as illustrated in FIGS. 14A and 14B, a portion 84 of mounting mechanism 68 is configured to have a shoulder portion 86 configured for engaging a mounting member of a backing plate of an airbag module. In addition, portion 84 is configured to extend past the steering wheel armature as well as provide a channel or receiving area 90. Channel 90 is configured to allow a tool such as a screwdriver to be inserted therein to pry the mounting member away from shoulder portion 86 thereby allowing airbag module to be disengaged from the mounting mechanism. Alternatively, mounting mechanism 68 can be configured to include a feature that is engaged by a locking member and aperture disposed on the backing plate.

Figure 15:
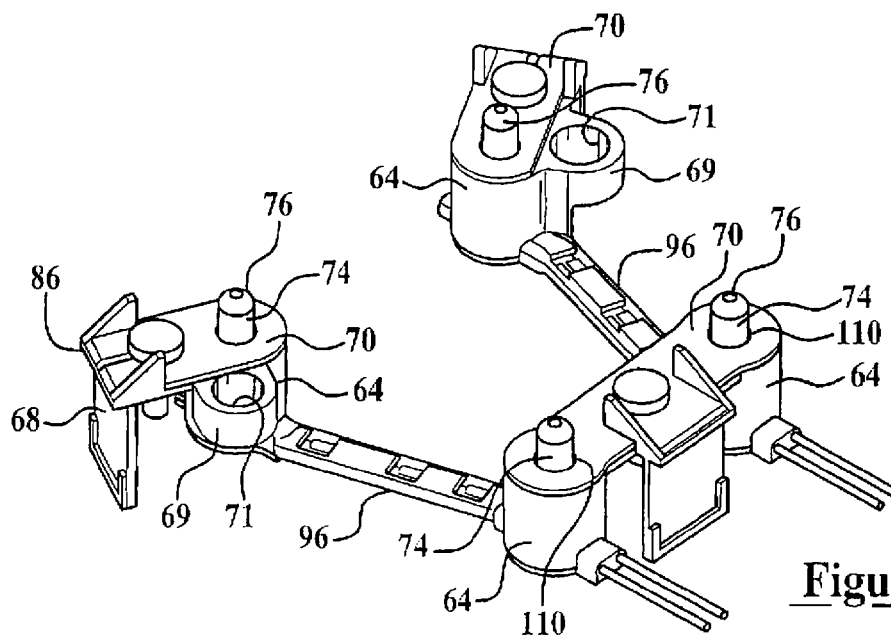

Referring now to FIG. 15, an alternative arrangement of the mounting mechanism of FIGS. 14A and 14B is illustrated.

Here a plurality of horn activation switches are configured for use with a plurality of horn mounting mechanisms 68. As illustrated in FIG. 15 horn activation switches are configured to be secured to a single mounting mechanism wherein the other two horn activation switches are secured to separate mounting mechanisms. In this embodiment, a pair of conduits 96 are provided. Each conduit 96 provides a passage for a pair of wires 48, wherein an un-insulated portion of the pair of wires is disposed within the lower portion of the housing such that contact portions 78 of plungers 74 complete the horn activation circuit.

FIG. 16 illustrates yet another exemplary embodiment wherein the mounting mechanism and horn activation switch of the FIG. 15 embodiment is associated with a mass damper 100 movably secured to the steering wheel armature. Mass damper 100 will be secured to the steering wheel via a biasing member tuned to a specific frequency in order to cancel out unwanted vibrations in the steering wheel. In addition, some of the mounting members are configured to have guide portions 69 with guide openings 71 associated thereto. Openings 71 are configured to receive and engage datum locators 73 of a flange or a base plate 75 of an inflator 77. Accordingly, the openings of the guide portions are configured to limit the X and Y movement of the inflator as taught by U.S. patent application Ser. No. 10/373,161, filed Feb. 24, 2003, the contents of which are incorporated herein by reference thereto.

FIG. 17 illustrates the pair of wires and their un-insulated portions as viewed from the bottom of the housing of the horn activation switch. As illustrated, contact point 78 is configured to make contact with each of the un-insulated portions of the pair of wires so as to complete the horn activation circuit as the airbag module is depressed towards the steering wheel armature and the plungers are depressed and the contact point allows a horn activation circuit to be completed.

FIG. 18 is a top perspective view of housing 64 wherein an inner opening 102 is illustrated. Inner opening 102 is configured to receive plunger 74 therein. Opening 102 comprises a flange portion 104 defining an inner opening 106. Inner opening 106 is configured to allow a lower contact portion of the plunger to be slidably received therein. Flange portion 104 provides a surface for contacting with the biasing member or spring 82 configured to be disposed about to the lower portion of the plunger between annular portion 80 wherein spring 82 provides a biasing forced to plunger 74 via annular portion 80 and flange portion 104. In addition, flange portion 104 prevents the biasing member or spring from making contact with the un-insulated portions of the wires disposed in housing 64 thus preventing inadvertent activation of the horn circuit. In the illustrated embodiment, and as shown in FIGS. 15-18, the mounting plate 70 provides a means for retaining plunger 74 in opening 102 as well as comprising an opening 110 configured to allow a portion of plunger 74 to slide therethrough thus making contact with the backing plate of the airbag module.

Figure 19:
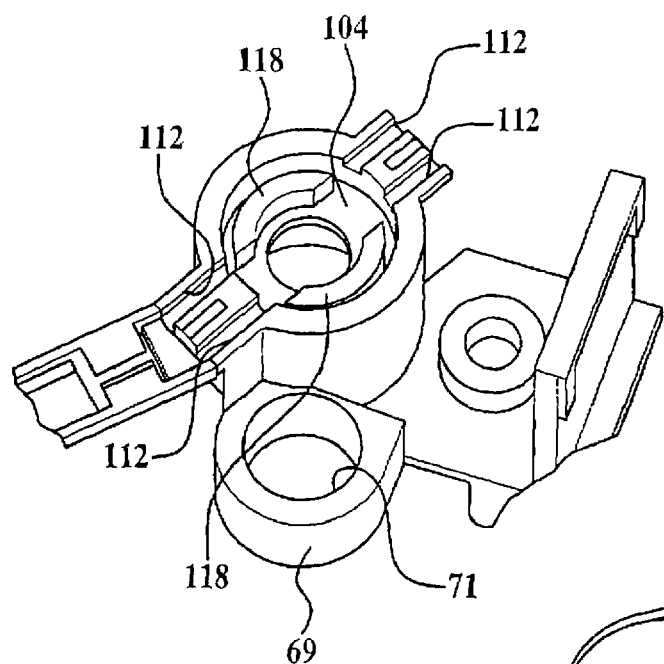
Figure 20:
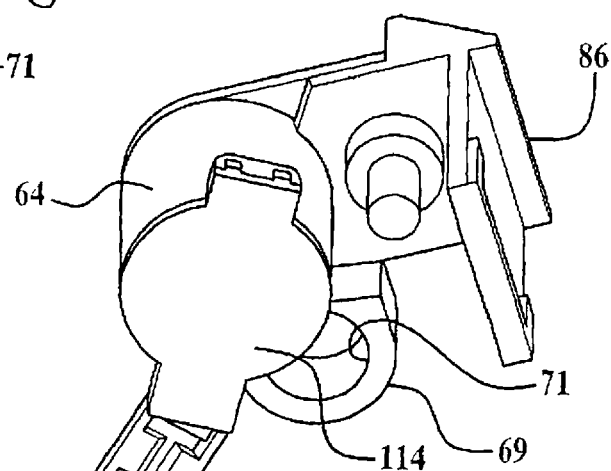
Figure 21:
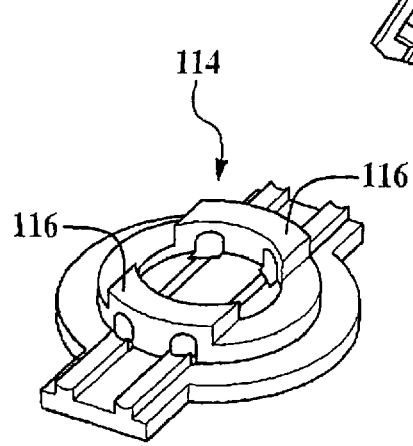
Figure 22:
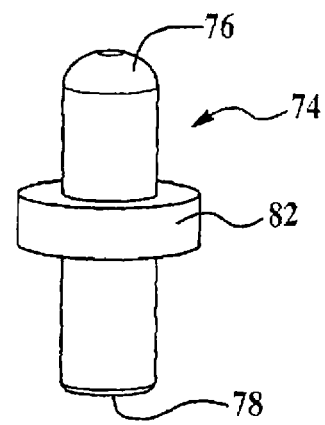
Figure 23:
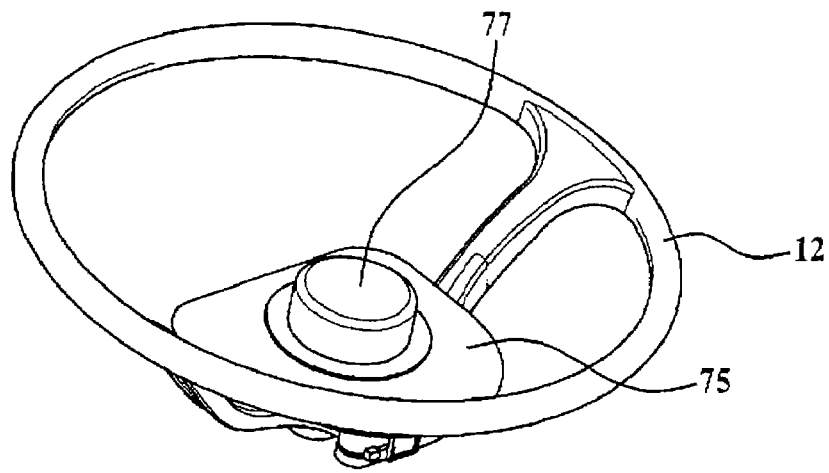
Figure 24:
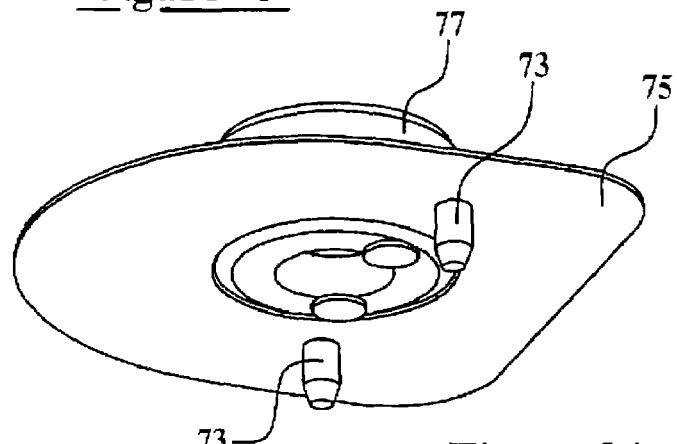

FIG. 19 illustrates a bottom view of housing 64 wherein conduit openings 112 are defined partially by housing 64 and a lower housing mounting member 114. Lower housing mounting member 114 is configured to have a pair of features 116 configured to be received within openings defined by a complementary pair of features 118 of housing 64. Accordingly, and when lower housing mounting member 114 is secured to housing 64, a pair of openings is provided for insertion of wires therein. As illustrated in FIG. 17, an un-insulated portion of the wires is received in the lower portion of the housing, wherein the contact point of the plunger is able to make contact and complete the horn activation circuit.

Figure 25:
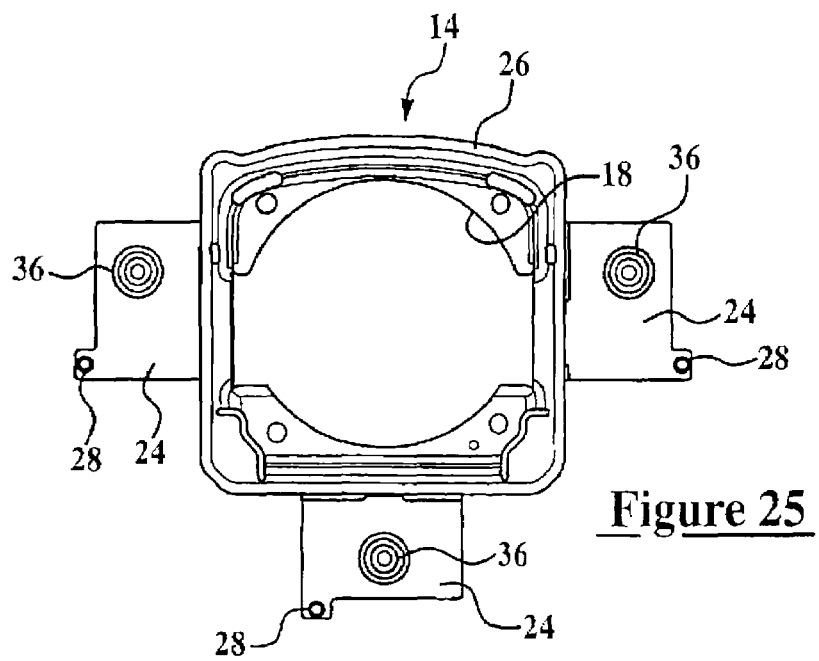
FIGS. 25-29 are views of a mounting mechanism and horn activation switch constructed in accordance with other alternative exemplary embodiments of the present invention.
Figure 26:
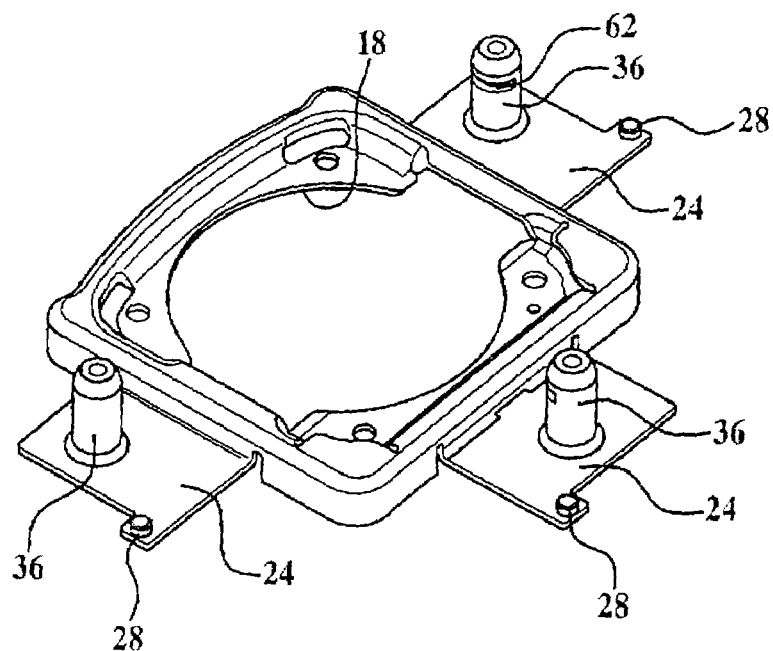

FIG. 25-26 illustrate yet another alternative exemplary embodiment of the present invention wherein the mounting portions of the backing plate comprise integral locking pins 36.

Figure 27:
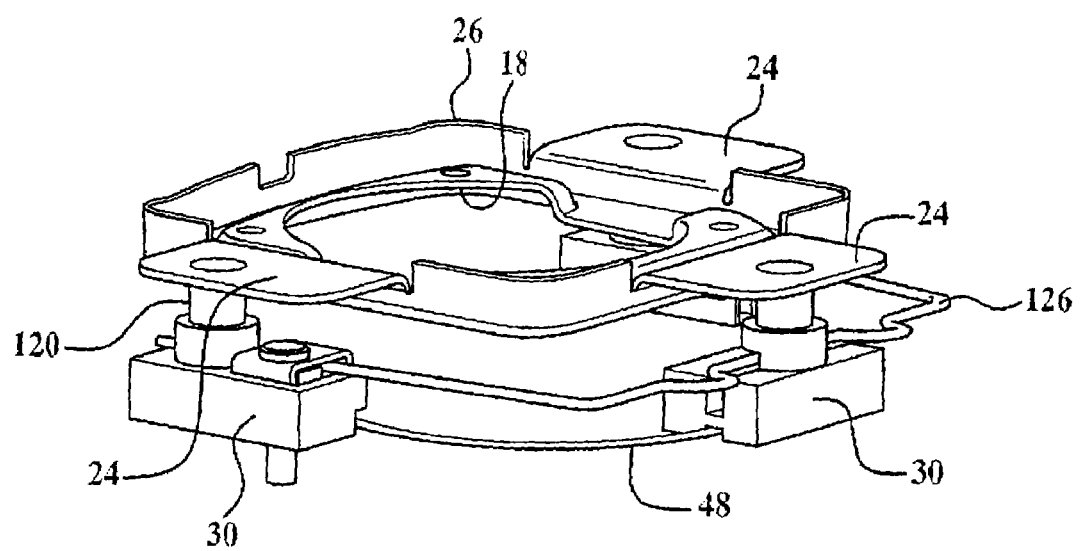
Figure 28:
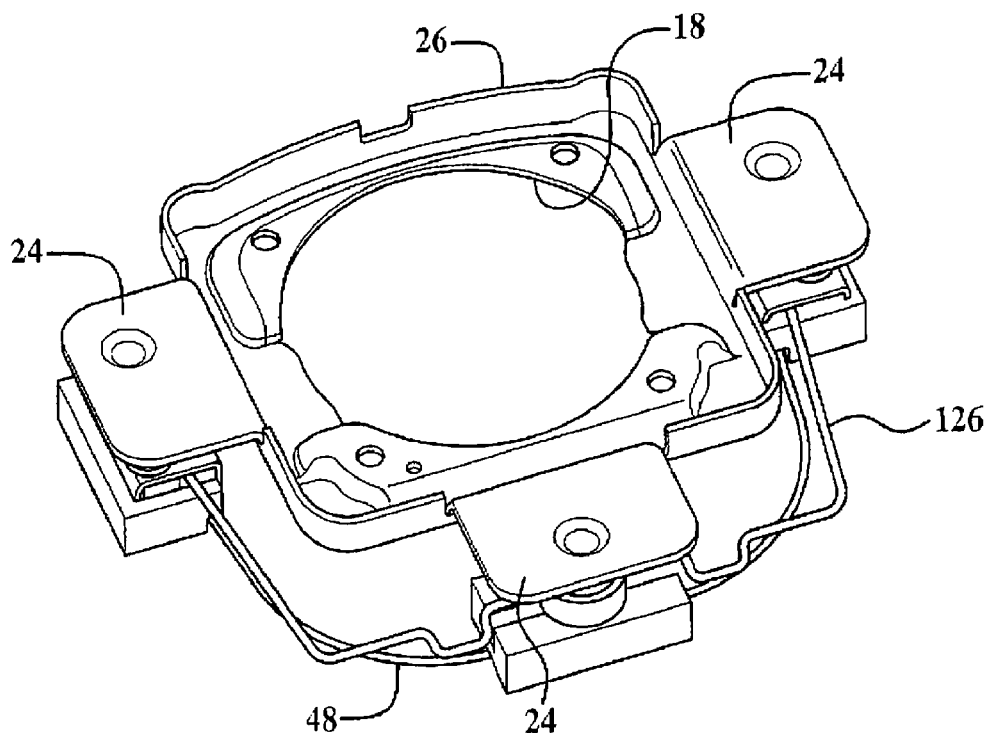
Figure 29:
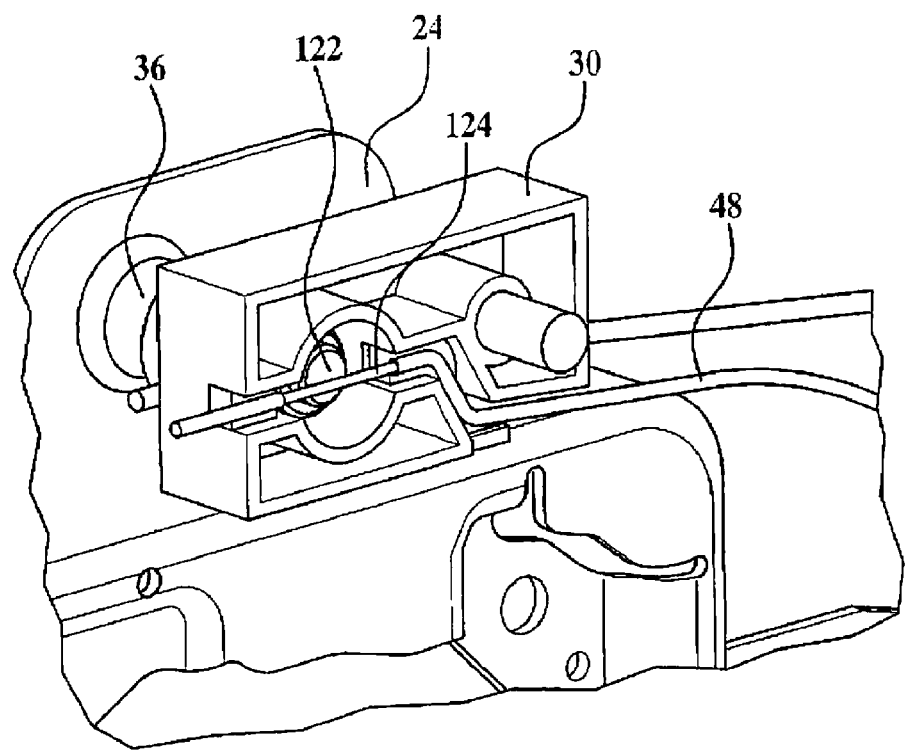

FIGS. 27-29 illustrate yet another alternative exemplary embodiment wherein the backing plate comprises integral locking pins 36, which are configured to be received within an opening 120 of a mounting member 30 and each locking pin 36 provides a guiding feature, a locking feature via opening 62 and a horn switch feature via a conductive tip portion 122 which makes contact with an un-insulated portion 124 of a wire 48 as the backing plate moves towards the mounting members. As illustrated, openings 62 engage a retaining member 126 configured and positioned to engage openings 62.

This embodiment reduces the stack tolerance of the airbag module through the incorporation of a horn contact mechanism into the attachment features of the airbag module. The backing plate of these embodiments may be constructed in accordance with the disclosure and teachings of U.S. provisional patent application Ser. No. 60/608,595, filed Sep. 10, 2004, the contents of which are incorporated herein by reference thereto.

Figure 30:
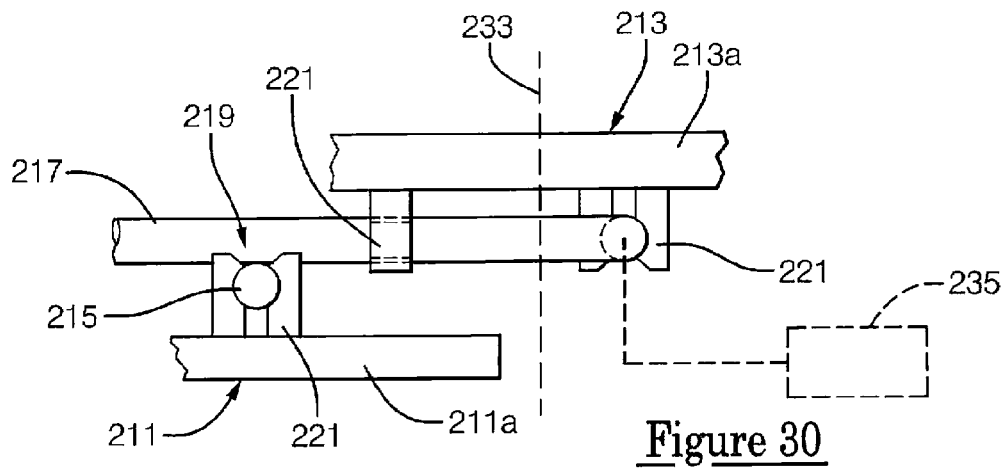
FIG. 30 is an illustration of principle of a part of a steering wheel arrangement in accordance with the invention with a closed horn contact.
Figure 31:
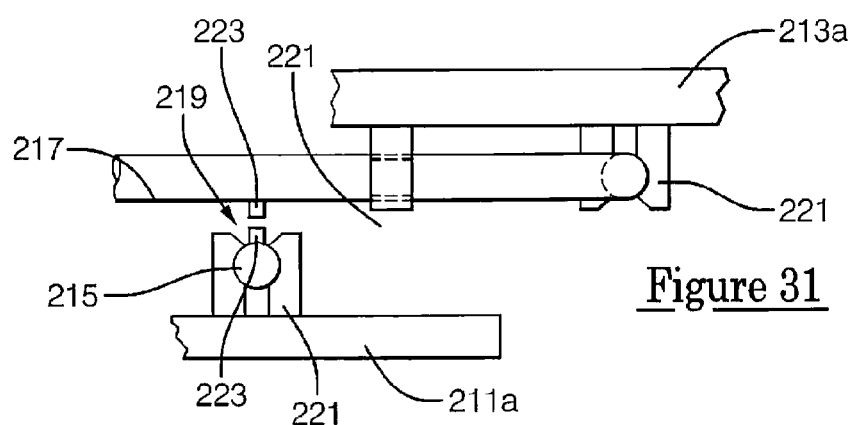
FIG. 31 is an illustration corresponding to FIG. 30 with an open horn contact.

Referring now to FIGS. 30-38 other alternative exemplary embodiments of the present invention are illustrated. FIGS. 30 and 31 simply show, in schematic form, a carrier 213a for a gas generator of an airbag module 213 and also a contact bridge 211a associated in the context of this application with a steering wheel 211.

The steering wheel arrangement includes a so-called "isolated floated horn" mechanism by which a schematic illustrated vehicle horn 235 is actuated by depressing the airbag module and thus moving the generator carrier 213a downwardly in the direction of the contact bridge 211a.

The generator carrier 213a and the contact bridge 211a are provided at their mutually confronting sides with electrical contact wires 215, 217 which are laid, at least regionally, in a plane which extends perpendicular to the steering wheel axis 233. The contact wires 215, 217 are attached by means of individual electrically insulating holders 221 to the generator carrier 213a and to the contact bridge 211a respectively. The individual holders 221 are either integral components of the generator carrier 213a and the contact bridge 211a or separate components which are secured to them following the manufacture of the generator carrier 213a and the contact bridge 211a.

The connection between the contact wires 215, 217 and the holders 221 takes place by clipping or latching.

Alternatively, the holders 221 could also be omitted and the contact wires 215, 217 could be directly clipped or latched to the generator carrier 213a and the contact bridge 211a. In accordance with a further alternative it is possible to dispense with such shape locked and/or force-transmitting connections and the contact wires 215, 217 could be integrated, during or after the manufacturing of the generator carrier 213a and the contact bridge 211a, into the generator carrier 213a or the contact bridge 211a respectively, by injecting plastic material around them.

The contact wires 215, 217 are laid in such a way that they cross at at least one contact position 219. At this contact position 219 the contact wires 215, 217 consequently enter into contact with one another when the airbag module 213 or the generator carrier 213a is depressed by the user from the open position of FIG. 31 and pressed towards the steering wheel 211, i.e. the contact bridge 211a, into the closed position in accordance with FIG. 30. Through the contact of the contact wires 215, 217 at the contact position or contact positions 219 an electrical circuit is closed and the vehicle horn is actuated.

An advantage of this "contact wire switch" in accordance with the invention in comparison to customary contacting types, such as microswitches or so-called "snap-frogs" is the pronounced contactile feeling. Moreover, the unit costs for the steering wheel unit or the component assembly which is to be installed at the steering wheel can be considerably reduced as a result of the invention.

In order to improve the electrical operability the contact wires 215, 217 are respectively provided at the contact position 219 or at the contact positions with a welded on contact piece 223, for example of a silver alloy. A high working life and ideal contact characteristics can be hereby ensured without the danger of problems with voltage drops and transition resistances.

Figure 32:
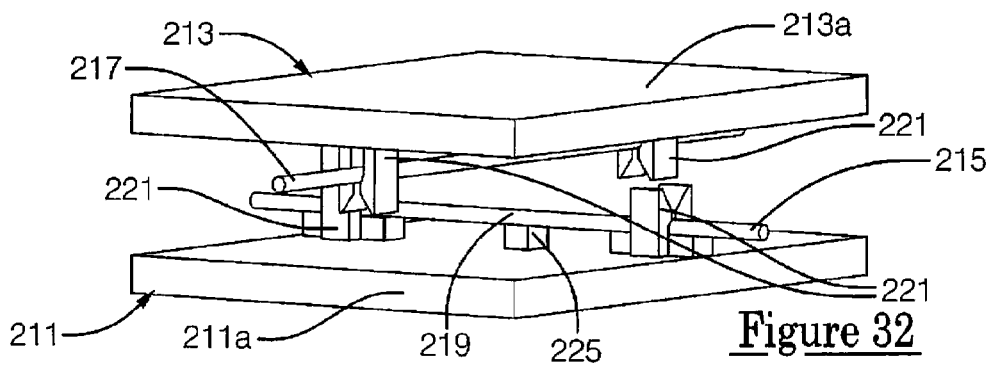
FIGS. 32-38 are further exemplary embodiments of the present invention in schematic representation.

As the example of FIG. 32 shows the conductors 215, 217 which are attached via holders 221 can be supported in the region of the contact position or touching position 219 by support elements 225 at the airbag module 213, or at the generator carrier 213a, and at the steering wheel 211, or at the contact bridge 211a.

Figure 33:
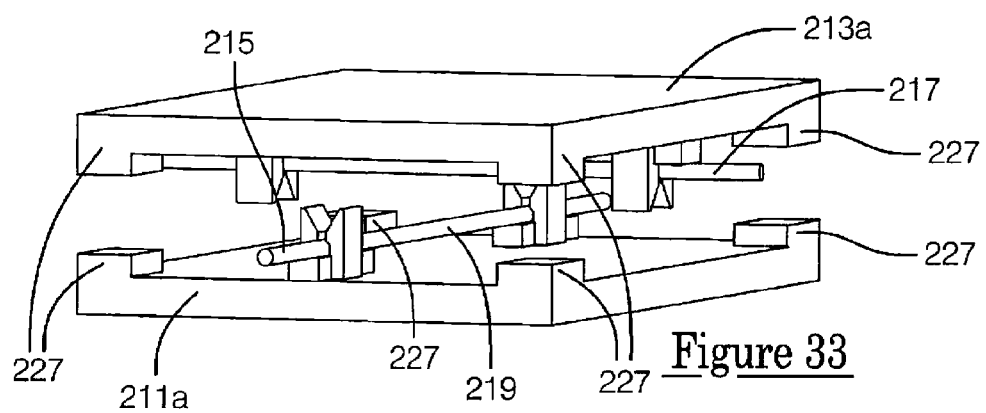

One alternative exemplary embodiment is shown in FIG. 33. Here the airbag module 213 or the generator carrier 213a and the steering wheel 211 or the contact bridge 211a are provided with abutments 227 through which a minimal spacing is predetermined in the direction of the steering wheel axis. In this manner the actuating load for the conductors (contact force) 215, 217 is predetermined.

Figure 34:
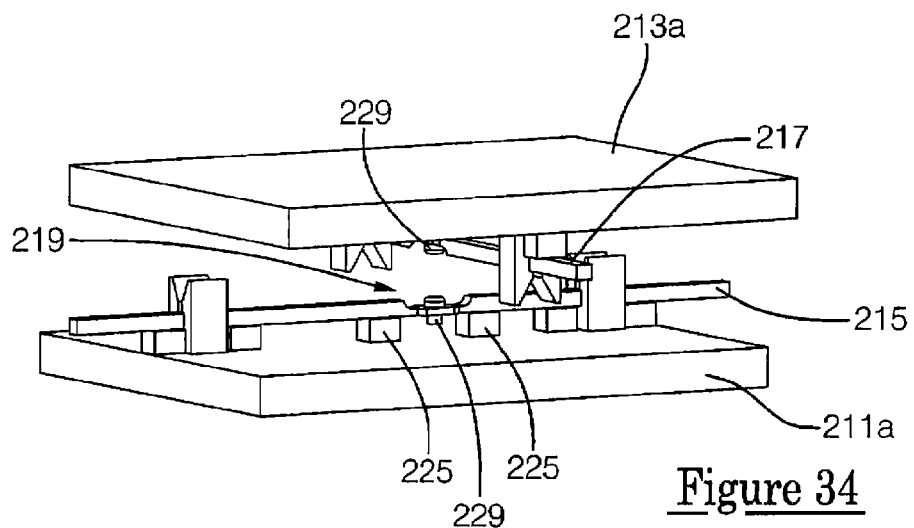

FIG. 34 shows an example in which the conductors 215, 217 are each provided in the region of the contact position 219 with a contact rivet 229. Respective support elements 225 are provided for the conductors 215, 217 on both sides of the conductor section provided with the rivet 229.

Figure 35:
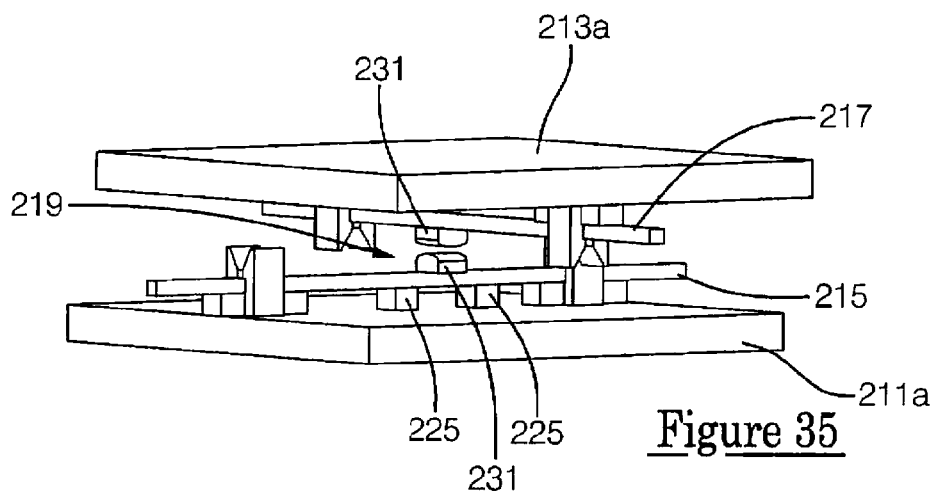

In the example of FIG. 35 the conductors 215, 217 are each provided in the region of the contact position 219 with a brazed or welded contact section 231.

In the above the clipping or latching of contact wires 215, 217 to the holders 221 has been mentioned. Alternatively it is also possible, during the manufacture, to mould the plastic material of the holders 221 around the wires 215, 217. Holders 221 of plastic can in particular also be injection moulded onto sheet metal parts, for example of a contact bridge. During this injection molding can simultaneously take place around the wires 215, 217.

The holders 221 from the contact wires 215, 217 can also be manufactured of a different material. In particular an electrically insulating material for the holder 221 is not required. In practice the airbag module is frequently electrically insulatingly mounted and the generator carrier consists of metal. In these cases no electrical insulation is required between the relevant contact wire 217 and the airbag module for the generator carrier, so that the holders 221 for the contact wires 217 can be manufactured from any desired material and in particular also from electrically conducting material.

Furthermore, mechanical end stops can be provided as protection for the contacts of the contact positions 219 between the airbag module and the steering wheel or its components and restrict the actuation path, for example during aggressive or panic-like actuation of the vehicle horn. An excessive loading of the contact positions 219, in particular an excessive extension or bending of the contact wires 215, 217 is hereby avoided.

In the foregoing the steering wheel side provision of the contact bridge has been mentioned as a variant of the invention. In this variant the contact bridge can thus be regarded as a component of the steering wheel. An inverted arrangement is likewise possible in accordance with the invention and in many cases represents the preferred embodiment. For example, in the inverted variant the floating horn system and thus the contact bridge are connected to the airbag module.

Figure 36:
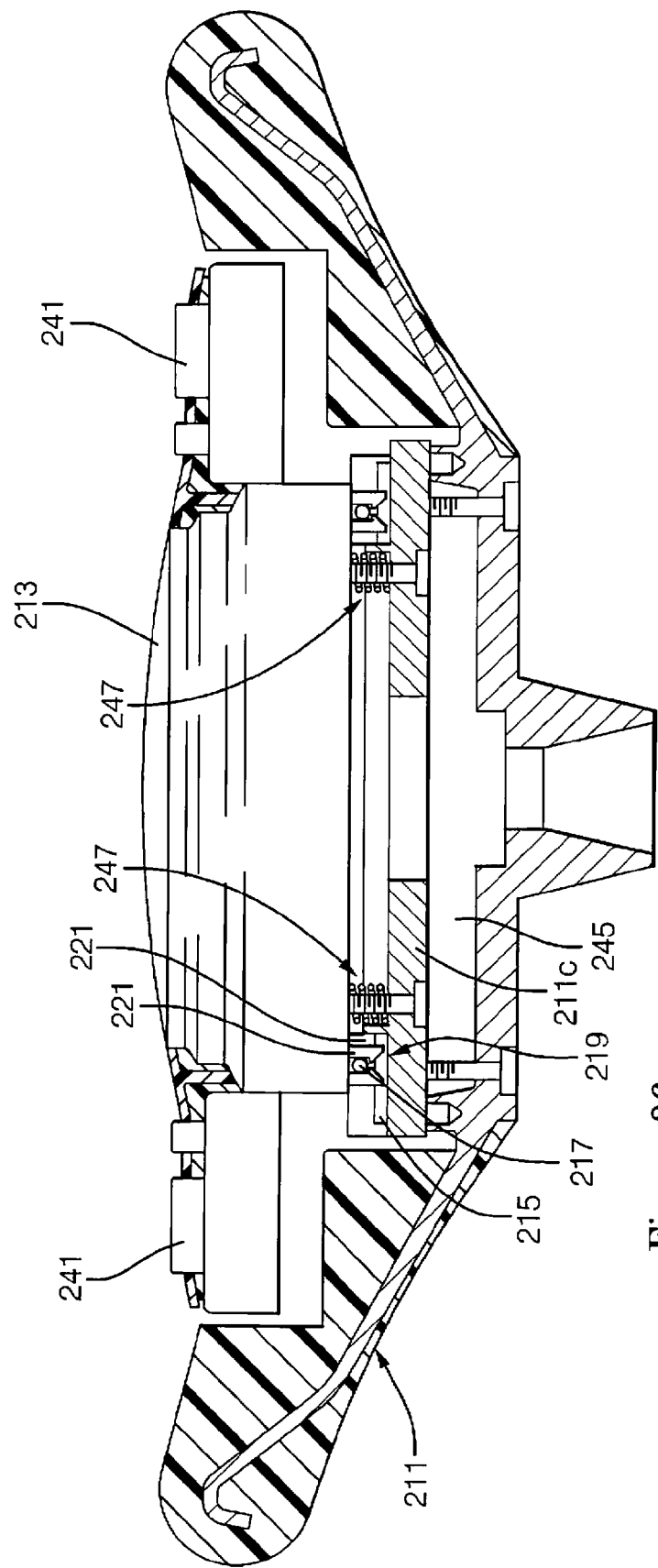

FIG. 36 schematically shows a contact system in accordance with the invention in its inbuilt environment. A contact bridge 211c is attached to the steering wheel 211. The constructional space 245 present between the con-tact bridge 211c and the steering wheel 211 can be utilized for a so-called vibration damper, which will not be discussed in more detail here. With the airbag module 213 "floatingly" mounted on the steering wheel and/or on the contact bridge 211c by means of spring arrangements 247, the horn switch formed by the contact system in accordance with the invention can be actuated by depressing it as a whole ("floating horn").

In each case one or more contact wires 215 and 217 respectively held in individual holders 221 are attached to the upper side of the contact bridge 211c and to the lower side of the airbag module 213. The wires 217 at the airbag module side and the wires 215 at the steering wheel side cross at a plurality of contact positions 219.

When the user depresses the airbag module 213 as a whole for the actuation of the vehicle horn and moves it in the direction of the fixed contact bridge 211c of the steering wheel 211, then the wires 215, 217 enter into electrical contact at at least one contact position 219, whereby the horn switch formed by this contact system is closed.

The airbag module 213 is provided in this example with additional functional switches 241 which can alternatively also be attached to the steering wheel 211.

Figure 37:
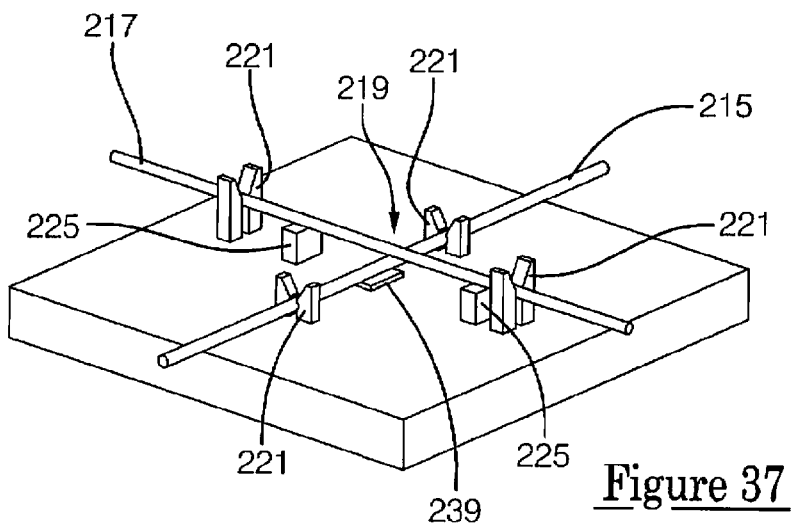
Figure 38:
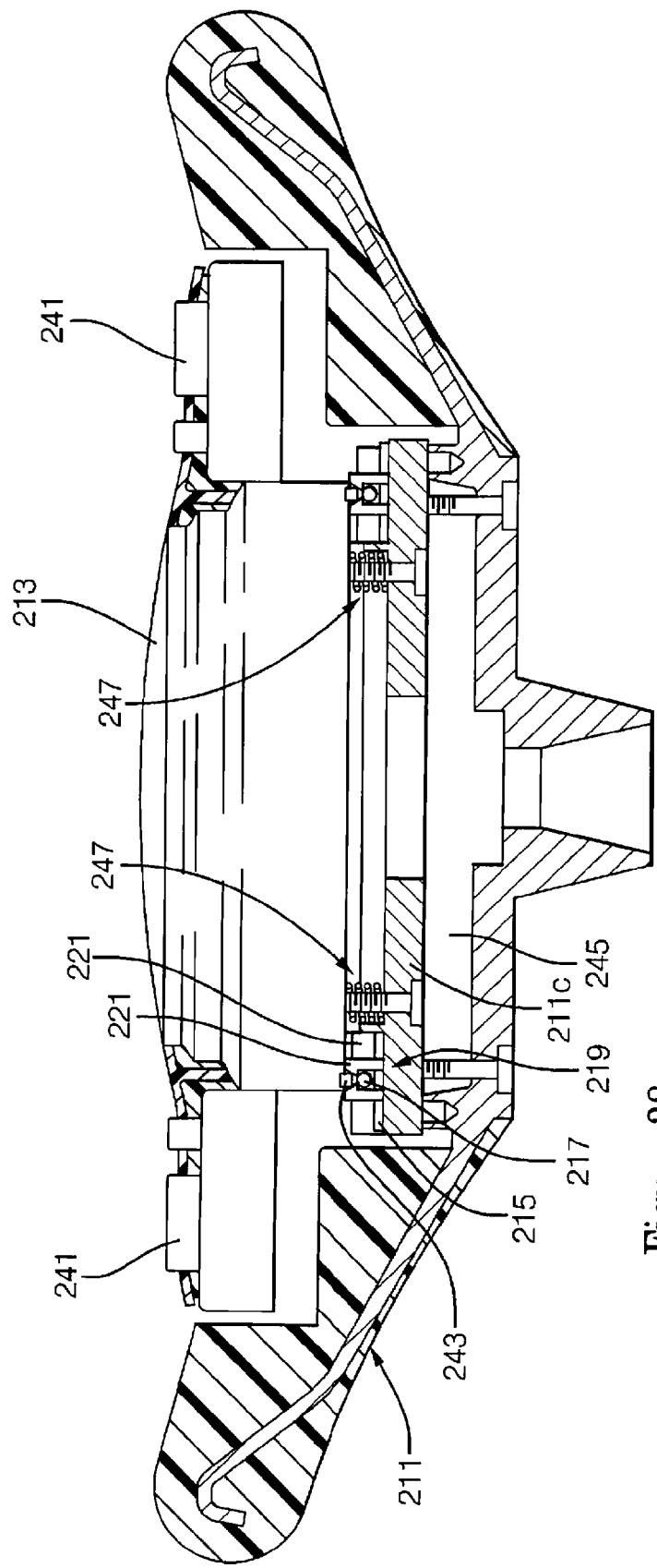

FIGS. 37 and 38 show an embodiment which has already been discussed in the introduction and which is distinguished from the above-explained variants amongst other things in that two contact wires 215, 217 are attached to a common component 237 which will be referred to generally as the "carrier" in the following. In other respects FIG. 38 corresponds to FIG. 36. The carrier 237 can either be the steering wheel, the airbag module or a component of one of these two components, for example a contact bridge 211a (as in FIG. 38).

For the actuation of the electrical functional unit, in particular of the vehicle horn no relative movement of the two wires 215, 217 as a whole takes place. On the contrary—if the carrier 237 is, for example, the steering wheel 211 (FIG. 38)—the upper wire 217 disposed in FIG. 37 closer to the airbag module is pressed downwardly in the region of the contact position 219 against the lower wire 215. The upper wire 217 thus bends and can—as shown in FIG. 37—be made thinner than the lower wire 215 for which a support 239 can be provided disposed at the contact position 219. For the loading of the wire 217 which is to be bent, the relevant component—in the example of FIG. 38 the airbag module 213—can be provided with a suitably positioned and shaped, for example spigot-like or pin-like actuating projection 243, which, during the relative movement between the airbag module 213 and the steering wheel 211 loads the relevant wire 217 at the contact position 219 and thereby presses it against the other wire 215 in order to produce the desired electrical contact between the two wires 215, 217.

In accordance with FIG. 38 contact wires 215, 217 which cross at a plurality of contact positions 219 are held in individual holders 221 and are attached to the upper side of the contact bridge 211c. The airbag module 213 is provided at its lower side with a plurality of actuating projections 243 which, at each contact position 219, press the upper wire 217 against the lower wire 215 when the user presses the airbag module 213 as a whole for the actuation of the vehicle horn and moves it in the direction of the fixed contact bridge 211c of the steering wheel 211 and thus closes the horn switch.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A steering wheel arrangement for motor vehicles having a steering wheel, the arrangement comprising:

an airbag module held at the steering wheel and movable in the direction of an axis of the steering wheel, and an electrical contact system arranged between the steering wheel and the airbag module for the actuation of a vehicle horn by a relative movement between the steering wheel and the airbag module taking place in the direction of the steering wheel axis, wherein the contact system includes elongated electrical conductors which are attached to mutually confronting sides of the steering wheel and of the airbag module and extend in such a way that the conductors are spaced apart in the direction of the steering wheel axis and cross at at least one contact position, wherein the conductors are disposed in a perpendicular relationship with respect to each other, wherein the airbag module includes two holders integrally formed and extending from the confronting side, each holder having an end remote from the confronting side and a slot extending from the end and comprising a form-fitted aperture retaining the elongated electrical conductor and an opening extending from the end for inserting the elongated electrical conductor into the form-fitted aperture in the direction of the axis, said holders being spaced apart and said elongate electrical conductor being disposed within the form-fitted apertures such that the contact position is between the holders.

2. The steering wheel arrangement in accordance with claim 1, wherein
the conductor is attached to a component of the airbag module which is manufactured of an electrically insulating material.

3. The steering wheel arrangement in accordance with claim 2, wherein
the steering wheel or the airbag module includes a contact bridge and at least one conductor is attached to the contact bridge.

4. The steering wheel arrangement in accordance with claim 3, wherein at least one conductor is attached to a carrier for a gas generator of the airbag module.

5. The steering wheel arrangement in accordance with claim 4, wherein at least one conductor is disposed in a plane extending perpendicular to the steering wheel axis.

6. The steering wheel arrangement in accordance with claim 5, wherein at least one conductor is provided in the form of a contact wire.

7. The steering wheel arrangement in accordance with claim 2, wherein the airbag module includes a support element underlying the contact point in a force-transmitting manner.

8. The steering wheel arrangement in accordance with claim 7, wherein the contact section further comprises a contact layer, which is a noble metal.

* * * * *